(12) United States Patent
Kowollik et al.

(10) Patent No.: US 8,197,699 B2
(45) Date of Patent: Jun. 12, 2012

(54) PROCESS FOR PREPARING METHYLHYDROXYALKYLCELLULOSE HAVING A SMALL NUMBER OF COLOURED PARTICLES

(75) Inventors: Martin Kowollik, Bad Fallingbostel (DE); Wolfgang Dannhorn, Soltau (DE); Erik-Andreas Klohr, Walsrode (DE); Hartwig Schlesiger, Walsrode (DE); Bernhard Kranz, Bomlitz (DE); Helmut Holste, Walsrode (DE); Gerd Sonnenberg, Walsrode (DE)

(73) Assignee: Dow Global Technologies LLC, Midland, MI (US)

( * ) Notice: Subject to any disclaimer, the term of this patent is extended or adjusted under 35 U.S.C. 154(b) by 901 days.

(21) Appl. No.: 11/522,218

(22) Filed: Sep. 15, 2006

(65) Prior Publication Data

US 2007/0210014 A1    Sep. 13, 2007

(30) Foreign Application Priority Data

Sep. 17, 2005   (DE) .................. 10 2005 044 452

(51) Int. Cl.
*B01D 37/00* (2006.01)
(52) U.S. Cl. .......... 210/784; 210/402; 536/56; 536/127; 536/128
(58) Field of Classification Search .................. None
See application file for complete search history.

(56) References Cited

U.S. PATENT DOCUMENTS

| 4,266,413 | A | * | 5/1981 | Yli-Vakkuri .................... 68/158 |
| 4,309,288 | A | * | 1/1982 | Ryan et al. .................... 210/395 |
| 4,491,661 | A | * | 1/1985 | Bredereck et al. ............. 536/84 |
| 4,502,171 | A | * | 3/1985 | Koskinen et al. ................. 5/156 |
| 4,769,986 | A | * | 9/1988 | Kokkonen et al. .......... 68/181 R |
| 4,954,268 | A | | 9/1990 | Just et al. |
| 4,963,271 | A | | 10/1990 | Raehse et al. |
| 4,968,789 | A | | 11/1990 | Wuest et al. |
| 4,979,681 | A | * | 12/1990 | Donges et al. .................. 241/17 |
| 5,473,061 | A | * | 12/1995 | Bredereck et al. ............. 536/59 |
| 5,482,634 | A | * | 1/1996 | Goerlach-Doht et al. ..... 210/651 |
| 6,392,035 | B1 | * | 5/2002 | Karstens et al. ................ 536/84 |
| 6,686,464 | B1 | * | 2/2004 | Harding et al. ................. 536/84 |
| 6,960,660 | B2 | * | 11/2005 | Niinobe et al. ................. 536/85 |
| 7,022,837 | B2 | * | 4/2006 | Harding et al. ................. 536/84 |
| 7,807,060 | B2 | * | 10/2010 | Schmid ........................ 210/769 |
| 2005/0051473 | A1 | | 3/2005 | Suss et al. |
| 2007/0210014 | A1 | * | 9/2007 | Kowollik et al. ............. 210/784 |
| 2008/0061011 | A1 | * | 3/2008 | Schmid ........................ 210/769 |

FOREIGN PATENT DOCUMENTS

| DE | 602759 | 9/1934 |
| DE | 3622103 | 2/1988 |
| EP | 0 305 898 | 3/1989 |
| EP | 0 305 899 | 3/1989 |
| EP | 0326939 | 8/1989 |
| EP | 0 632 056 | 1/1995 |
| EP | 1 375 523 | 1/2004 |
| WO | WO-00/32637 | 6/2000 |
| WO | WO-02/100512 | 12/2002 |

OTHER PUBLICATIONS

Karppinen et al., "Solutions for Filtration Problems with BHS Filters," *Filtration & Separation*, (Apr. 1997), pp. 214-215.
Database Internet [Online] Apr. 2003, XP002412772, gefunden im www.bhs-sonthofen.de/misc/ddf.pdf, *Seite 3*, *Seite 5, 2. Absatz*.
Database Internet [Online] Apr. 2003, XP002412772, gefunden im www.bhs-sonthofen.de/misc/ddf.pdf, *Seite 3*, *Seite 5, 2. Absatz*.

* cited by examiner

*Primary Examiner* — Robert James Popovics

(57) ABSTRACT

The present invention describes a process for preparing methylhydroxyalkylcellulose having a small number of colored particles by separation of methylhydroxyalkylcellulose from aqueous suspension with subsequent washing of the methylhydroxyalkylcellulose using a specially equipped rotary pressure filter.

6 Claims, No Drawings

PROCESS FOR PREPARING METHYLHYDROXYALKYLCELLULOSE HAVING A SMALL NUMBER OF COLOURED PARTICLES

CROSS REFERENCE TO RELATED APPLICATIONS

This application claims benefit to German Application No. 10 2005 044 452 filed Sep. 17, 2005 which is incorporated by reference in its entirety for all useful purposes.

FIELD OF THE INVENTION

The present invention describes a process for preparing methylhydroxyalkylcellulose having a small number of coloured particles by separation of methylhydroxyalkylcellulose from aqueous suspension with subsequent washing of the methylhydroxyalkylcellulose using a specially equipped rotary pressure filter.

BACKGROUND OF THE INVENTION

Methylhydroxyalkylcellulose is generally prepared by alkalization of pulp and subsequent reaction with etherifying agents such as methyl chloride, ethylene oxide or propylene oxide in the presence of suitable solvents or suspension media (cf. Ullmanns Enzyklopädie der technischen Chemie, 4th Edition, Volume 9, page 205, or Houben-Weyl, Methoden der organischen Chemie, 4th Edition, Volume E 20, part 3, page 2047). The crude methylhydroxyalkylcelluloses obtained in the preparation of methylhydroxyalkylcellulose contain undesirable by-products such as sodium chloride, methanol, glycols, etc. Depending on the degree of substitution, the methylhydroxyalkylcellulose prepared displays a differing, temperature-dependent dissolution behaviour in aqueous media. The methylhydroxyalkylcelluloses described here are generally insoluble in hot water and flocculate out, so that the undesirable by-products are, according to the prior art, dissolved by suspension of the crude methylhydroxyalkylcellulose in hot water and are washed out of the crude methylhydroxyalkylcellulose in a subsequent separation and washing step. When the term methylhydroxyalkylcellulose suspension is used in the following, it is, unless indicated otherwise, always a suspension of crude methylhydroxyalkylcellulose and the by-products obtained in the preparation of crude methylhydroxyalkylcellulose in hot water. Some of the separation, purification and washing methods used according to the prior art are described in EP 03 05 898 A2, EP 03 05 899 A2 and EP 0 632 056 B1. Depending on the field of application of the methylhydroxyalkylcellulose, it has to meet more or less strict purity requirements, so that a suitable washing step has to be an indispensable part of the preparative process.

To be able to prepare products for a wide variety of applications, it has to be possible to prepare methylhydroxyalkylcelluloses having different degrees of substitution. The alkyl substitution is generally described by the DS in cellulose ether chemistry. The DS is the mean number of substituted OH groups per anhydroglucose unit. The methyl substitution is reported, for example, as DS (methyl) or DS (M). The hydroxyalkyl substitution is usually described by the MS. The MS is the mean number of moles of etherifying reagent bound via an ether bond per mole of anhydroglucose unit. The etherification with the etherifying reagent ethylene oxide is reported, for example, as MS (hydroxyethyl) or MS (HE). The etherification with the etherifying reagent propylene oxide is correspondingly reported as MS (hydroxypropyl) or MS (HP). The determination of the side groups is carried out by the Zeisel method (reference: G. Bartelmus and R. Ketterer, Z. Anal. Chem. 286 (1977) 161-190).

The degree of substitution of the methylhydroxyalkylcellulose has an influence on the required temperatures of the hot water suspension and the washing liquids used in the washing step. The temperatures of the hot water suspension and the washing liquids are usually in the range from 80° C. to 100° C., preferably from 85° C. to 98° C.

Various properties of the methylhydroxyalkylcellulose, e.g. the thermal flocculation point, the solubility in water or organic solvents, the viscosity of the solutions produced, the film formation capability, the water retention capability or the adhesive strength, are set via the degree of etherification and the type of substituents.

Owing to these many excellent properties, methylhydroxyalkylcelluloses are used in a wide variety of applications.

Firstly, they are used in industrial applications as, for example, thickeners, adhesives, binders, dispersants, water retention agents, protective colloids, stabilizers, suspension media, emulsifiers, film formation agents and as consistency regulators and processing aids in mineral and dispersion-based building materials systems.

Secondly, they are used in sensitive applications, for example in the production of cosmetic and pharmaceutical preparations, in the coating of tablets, in eye drop suspensions, in contact lens cleaners and the like or in the production of foodstuffs in which cellulose ethers having a particularly high purity are required (cf. WO 00/32637). High purity means adherence to the appropriate pharmaceutical standards (e.g. pharmaceutical monographs), for example in respect of degree of substitution, heavy metal content, viscosity of the solution, organic impurities, etc. Furthermore, further legal regulations and additional wide-ranging customer requirements have to be met.

Thirdly, methylhydroxyalkylcelluloses are used in high-value industrial applications, for example in the production of speciality ceramics and in suspension polymerization, which likewise require a particularly high purity. In these applications, high purity means, in particular, low contamination of a physical type.

An important quality criterion for customers in the sensitive applications and high-value industrial applications is visual assessment of the methylhydroxyalkylcellulose in respect of physical contamination, known as coloured particles.

Neither pharmaceutical nor other regulations gives specifications in respect of coloured particles in methylhydroxyalkylcellulose for sensitive applications and high-value industrial applications. The assessment of this quality criterion has to be undertaken by customers and is generally carried out by means of subjective, visual assessment. Accordingly, the assessment of methylhydroxyalkylcellulose in respect of coloured particles is carried out by comparison with samples which are assessed after provision of samples by the customer.

The following four classifications are obtained:
(1) very good, i.e. better than a comparative sample provided by the customer
(2) good, comparable with a comparative sample provided by the customer
(3) acceptable, only slightly worse than a comparative sample provided by the customer and
(4) not acceptable, i.e. worse than a comparative sample provided by the customer.

EP 1 375 523 A1 describes a method of selecting methylhydroxyalkylcellulose in order to obtain, firstly, improved properties in the filtration of aqueous solutions of the methylhydroxyalkylcellulose and, secondly, to obtain films having no defects from the aqueous solution of the methylhydroxyalkylcellulose. The method described here is in principle also suitable for preparing methylhydroxyalkylcellulose having a low content of coloured particles. However, a disadvantage of the method described in EP 1 375 523 A1 is obviously that selection in industrial production processes always leads to the inevitable formation of amounts of product which do not meet the selection criteria and accordingly have to be disposed of, subjected to a reprocessing step or processed further in another way, which costs money.

After the crude methylhydroxyalkylcellulose has been suspended in hot water, the methylhydroxyalkylcellulose is separated off from the suspension medium by methods of the prior art, generally by pressing, centrifugation or filtration, with a distinction being made between discontinuously and continuously operating separation techniques (Grundoperationen chemischer Verfahrenstechnik, 11th Edition, page 164).

In principle, continuously and discontinuously operating pressing apparatuses, e.g. multiplaten presses, strainer presses, plate filter presses, travelling screen presses and screw presses, are suitable for separating off the methylhydroxyalkylcellulose from the suspension medium. Centrifuges are likewise suitable for separating off methylhydroxycellulose from the suspension medium. Known types of centrifuge include, for example, turnout centrifuges, peeler centrifuges, pusher centrifuges, mesh screw centrifuges, vibrating centrifuges and sliding centrifuges and decanters.

A further method which has attained importance for separating off methylhydroxyalkylcellulose is filtration. Here, a distinction is likewise made between discontinuous and continuous apparatuses. Discontinuously operating filters include, for example, fixed-bed filters, suction filters, candle filters, leaf filters and plate filters. The separation of methylhydroxyalkylcellulose from the suspension medium by means of discontinuously operating filters is generally less preferred. A disadvantage here is the loading and unloading of the filter, which requires a considerable time. Thus, discontinuously operating filters are not suitable for sufficiently large, economical throughputs.

Continuously operating filters such as belt filters and rotary filters have been found to be most useful as separation apparatuses, and rotary pressure filters as are known from WO 02/100512 A1 are particularly suitable.

These rotary pressure filters allow methylhydroxyalkylcelluloses which are used, for example, in industrial applications to be separated off economically on an industrial scale. However, if the methylhydroxyalkylcellulose is to be used in sensitive applications or high-value industrial applications which require a high purity, then the conventional rotary pressure filters optimized for the industrial applications and the corresponding materials which come into contact with the suspension and thus with the methylhydroxyalkylcellulose are not suitable.

It has been found that the use of conventional rotary pressure filters in the preparation of methylhydroxyalkylcellulose for sensitive applications and high-value industrial applications leads to an unacceptable number of coloured particles in the methylhydroxyalkylcellulose. The colour of the particles can, depending on the rotary pressure filter used, vary from greyish through brownish through to black colours.

One considerable way in which these coloured particles can be formed is associated with the unavoidable abrasion of the plastics used. This abraded material leads to no impairment of the product in the preparation of methylhydroxyalkylcellulose for industrial applications.

In the production process for methylhydroxyalkylcellulose for sensitive applications and high-value industrial applications, the suspensions of the crude methylhydroxyalkylcellulose and the associated by-products are obtained in particular compositions which display an increased degree of abrasion toward plastics which are usually employed in rotary pressure filter technology in the preparation of methylhydroxyalkylcellulose.

This increased abrasive action of the suspensions obtained in the preparation of methylhydroxyalkylcellulose for sensitive and high-value industrial applications may lead to an increased, unacceptable number of coloured particles in the end product.

SUMMARY OF THE INVENTION

The invention relates to a rotary pressure filter which comprises a plurality of zones separated from one another by separation plates, including at least one drying zone characterized in that the separation plates which seal off the drying zone(s) comprise heat-resistant, abrasion-resistant plastic and in that the separation plates which seal off the other zones comprise plastics having good sliding and abrasion properties.

It was therefore an object of the present invention to provide an effective and economical, continuous process having high availability and a high throughput for the separation and washing of suspensions of methylhydroxyalkylcellulose which is insoluble in hot water and the above-described by-products in hot water so that the end product can, firstly, be prepared in a targeted manner and does not have to be selected from a large amount of product and, secondly, contains only a small number of coloured particles which is acceptable for sensitive and high-value industrial applications.

According to the invention, this object is achieved for the process of the abovementioned type by a continuously operating rotary pressure filter equipped in a specific way with separation plates being used as means for separating off the suspension liquid and for washing the methylhydroxyalkylcellulose.

DETAILED DESCRIPTION OF THE INVENTION

Rotary pressure filters are known in industry. A rotary pressure filter is a continuously operating filter having a pressure-tight design. It consists essentially of a metallic filter drum which rotates at a continuously regulatable speed, an associated control head and a metallic, pressure-rated housing. The annular space between the filter drum and the housing is sealed at the sides by means of stuffing boxes or other sealing systems. The housing is divided radially into pressure-tight chambers by means of zone separators which are pressed pneumatically onto the drum. The surface of the drum comprises individual filter cells which are connected via outlet tubes to the control head. A detailed description may be found in WO 02/100512 A1. The suspension to be filtered is fed continually under a constant admission pressure into the separation zone of the rotary pressure filter, resulting in a filtercake being built up in the filter cells of the rotating drum and subsequently being conveyed into the subsequent chambers for after-treatment, e.g. washing and/or treatment with steam. The filtercake is taken off in an unpressurized zone of the filter either by means of an automatically operating, adjustable, mechanical scraper or/and by means of a targeted reverse pulse, typically of compressed air, nitrogen or steam.

A precise description of the zone separators may be found, for example, in WO 02/100512 A1.

In the separation and washing of methylhydroxyalkylcellulose suspensions by means of rotary pressure filters, the filtercake is treated with steam according to the prior art. In particular, the filtercake is treated with steam to adjust the residual moisture in a separate separation zone, known as the drying zone, before the unpressurized offtake zone. In previously mentioned processes, it is usual to use saturated steam having pressures of from 0.1 bar gauge to 6.0 bar gauge, preferably from 0.5 bar gauge to 4.5 bar gauge and particularly preferably from 0.8 bar gauge to 3.0 bar gauge. The pressures mentioned are, according to physical laws, unambiguously associated with the following saturated steam temperatures: 102.3° C. (0.1 bar gauge), 111.4° C. (0.5 bar gauge), 116.9° C. (0.8 bar gauge), 143.6° C. (3.0 bar gauge), 155.5° C. (4.5 bar gauge), 165.0° C. (6.0 bar gauge) (cf., for example, VDI-Wärmeatlas).

Furthermore, the present invention concerns an individual part of the zone separator, namely a sealing layer, here referred to as separation plate, which has to be made of appropriately suitable plastics. This separation plate has to meet particular requirements since it is, firstly, fixed rigidly to the housing of the rotary pressure filter and is pressed against the metallic drum and consequently rubs, during the rotary motion of the drum, against the ribs which form the individual chambers on the surface of the drum and, secondly, comes into direct contact with the methylhydroxyalkylcellulose suspension to be filtered and washed and accordingly also with the filtercake.

The separation plates of rotary pressure filters are typically made of the plastics such as, but not limited to polyethylene (PE), polytetrafluoroethylene (PTFE), if appropriate with addition of, for example, 40% of, for example, glass fibres, mica, carbon and/or graphite, polyvinylidene fluoride (PVDF) and polyether ether ketone (PEEK). According to the prior art, the plastic suitable for the respective application is selected and all separation plates of the rotary pressure filter are manufactured therefrom. However, the generally known mechanical and thermal properties of these plastics can be employed only to a limited extent as an aid to the choice of the suitable plastic for the separation elements of a rotary pressure filter which is to be used for the separation and washing of a hot water suspension of crude methylhydroxyalkylcellulose and the associated by-products as part of the preparation of a methylhydroxyalkylcellulose for sensitive and high-value industrial applications, since the filtrate to be separated from the methylhydroxyalkylcellulose contains various by-products, e.g. NaCl in a high concentration, and has a temperature greater than 75° C., preferably greater than 85° C. and particularly preferably greater than 92° C. Both factors have a considerable influence on the properties of the plastics in the frictional use as separating element on the metallic drum of a rotary pressure filter. Thus, the corresponding system "plastic, steel, methylhydroxyalkylcellulose suspension including the by-products present" always has to be taken into consideration in the assessment of the properties, in particular the resistance, abrasion and frictional properties. In the abovementioned process for the separation and washing of methylhydroxyalkylcellulose suspensions for sensitive and high-value industrial applications, all plastics which are generally used for the separation plates have considerable disadvantages in respect of economical use, the resistance under the abovementioned process conditions or in respect of the abrasion resistance and thus the number of coloured particles in the end product.

Typical and customary materials for the production of such separation plates are, for example, polyethylene (PE), polytetrafluoroethylene (PTFE), polytetrafluoroethylene (PTFE) with addition of typically from 10% to 40% of glass fibres, mica, carbon and/or graphite and polyether ether ketone (PEEK).

In the conventional design of the rotary pressure filter in which all separation plates are made of one of the materials mentioned (i.e. all separation plates are made of the same material), the number of coloured particles found in the end product in the preparation of methylhydroxyalkylcellulose is unacceptable for sensitive and high-value industrial applications.

Surprisingly, we have found that the above-described disadvantages do not occur when a rotary pressure filter is equipped with separation plates which comprise the above-described plastics but the individual separation plates are made of different plastics.

In this design according to the invention, the plastics of the separation plates are to be selected so that the separation plates which seal off the drying zone at both sides comprise a heat-resistant, abrasion-resistant plastic, preferably polyether ether ketone (PEEK), and the remaining separation plates comprise plastics having good sliding and abrasion properties, preferably polyvinylidene fluoride (PVDF).

When a rotary pressure filter equipped with such separation plates according to the invention is used, all the above-mentioned disadvantages in the use of other apparatuses or the use of a rotary pressure filter having separation plates made of other plastics are avoided!

Accordingly, the present invention firstly provides a rotary pressure filter which has a plurality of zones, including a drying zone, which are separated from one another by separation plates, characterized in that the separation plates which seal off the drying zone on both sides comprise heat-resistant (above 145° C., preferably above 165° C.), abrasion-resistant (coefficient of sliding friction against steel, dry, of from 0.5 to 0.31, preferably from 0.4 to 0.31) plastic, particularly preferably polyether ether ketone (PEEK) and in that the remaining separation plates comprise one or more plastics having good sliding and abrasion properties (coefficient of sliding friction against steel, dry, of less than 0.4, preferably less than 0.35) and appropriate heat resistance (up to 140° C.), particularly preferably polyvinylidene fluoride (PVDF).

The present invention further provides a process for preparing methylhydroxyalkylcellulose which comprises filtering and/or washing a methylhydroxyalkylcellulose suspension using a rotary pressure filter according to the invention.

In a preferred embodiment, the methylhydroxyalkylcellulose is a methylhydroxypropylcellulose (MHPC) which has a proportion by mass of hydroxypropoxy groups of from 3.0 to 35.0%, in particular from 4.0 to 32.0%, and a proportion by mass of methoxyl groups of from 15.0 to 35.0%, in particular from 16.5 to 30.0%.

In another preferred embodiment, the methylhydroxyalkylcellulose is a methylhydroxyethylcellulose (MHEC) which has a degree of substitution MS (HE) of from 0.10 to 1.00, in particular from 0.15 to 0.80, and a degree of substitution DS (M) of from 1.25 to 2.20, in particular from 1.40 to 2.00.

The invention is illustrated by the following examples, without being restricted thereto.

EXAMPLES

Product Example 1

Hypromellose according to Pharma Monographie as Type 2910: the crude methylhydroxypropylcellulose to be separated and washed is prepared by the process described in Houben-Weyl, Methoden der Organischen Chemie, Makromolekulare Stoffe, 4th Edition, Volume E 20, p. 2042 (1987). After removal of excess amounts of reactants, the crude methylhydroxypropylcellulose obtained had the following properties:

| | |
|---|---|
| DS (M): | 1.95 |
| MS (HP): | 0.31 |
| Sodium chloride content: | 20% |

Product Example 2

Hypromellose according to Pharma Monographie as Type 2208: the crude methylhydroxypropylcellulose to be separated and washed is prepared by the process described. After removal of excess amounts of reactants, the crude methylhydroxypropylcellulose obtained had the following properties:

| | |
|---|---|
| DS (M): | 1.47 |
| MS (HP): | 0.21 |
| Sodium chloride content: | 16% |

Product Example 3

The crude methylhydroxyethylcellulose to be separated and washed is prepared by the process described. After removal of excess amounts of reactants, the crude methylhydroxyethylcellulose obtained had the following properties:

| | |
|---|---|
| DS (M): | 1.58 |
| MS (EP): | 0.29 |
| Sodium chloride content: | 18% |

Comparative Example 1

The crude methylhydroxypropylcellulose (product Example 1 or product Example 2) or crude methylhydroxyethylcellulose (product Example 3) suspended in hot water is separated and washed using the above-described rotary pressure filter. The rotary pressure filter is in this case equipped with separation plates made of polytetrafluoroethylene (PTFE) with addition of 25% of carbon/graphite. After the subsequent drying and milling processes, the methylhydroxypropylcellulose or methylhydroxyethylcellulose is characterized as described above in respect of the proportion of coloured particles. In all cases, an unacceptable proportion of coloured particles was found (classification: 4).

Example 2

The crude methylhydroxypropylcellulose (product Example 1 or product Example 2) or crude methylhydroxyethylcellulose (product Example 3) suspended in hot water is separated and washed using the above-described rotary pressure filter. The rotary pressure filter is in this case equipped with separation plates so that the separation plates which seal off the drying zone on both sides comprise polyether ether ketone (PEEK) and the remaining separation plates comprise polyvinylidene fluoride (PVDF).

After the subsequent drying and milling processes, the methylhydroxypropylcellulose or methylhydroxyethylcellulose is characterized as described above in respect of the proportion of coloured particles. In all cases, a readily acceptable proportion of coloured particles was found (classification: 1-2).

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

The invention claimed is:

1. A process for preparing methyl hydroxyalkylcellulose comprising the steps of:
providing a rotary pressure filter including at least one drying zone, said filter comprising:
at least one heat-resistant, abrasion-resistant plastic separation plate sealing the drying zone(s), said separation plate being made of polyether ether ketone; and
at least one additional separation plate which seals off zones other than the drying zone(s) is made of polyvinylidene fluoride;
introducing an aqueous suspension containing methylhydroxyalkylcellulose into said rotary pressure filter; and
separating said methylhydroxyalkylcellulose from said aqueous suspension using said rotary pressure filter to obtain a concentrated methylhydroxyalkylcellulose stream.

2. The process according to claim 1, wherein the methylhydroxyalkylcellulose is a methylhydroxyethylcellulose (MHEC) or a methylhydroxypropylcellulose (MHPC).

3. The process according to claim 1, wherein the methylhydroxyalkylcellulose is a methylhydroxypropylcellulose (MHPC) which has a proportion by mass of hydroxypropoxy groups of from 3.0 to 35.0% and a proportion by mass of methoxyl groups of from 15.0 to 35.0.

4. The process according to claim 1, wherein the methylhydroxyalkylcellulose is a methylhydroxypropylcellulose (MHPC) which has a proportion by mass of hydroxypropoxy groups of from 4.0 to 32.0% and a proportion by mass of methoxyl groups of from 16.5 to 30.0%.

5. The process according to claim 1, wherein the methylhydroxyalkylcellulose is a methylhydroxyethylcellulose (MHEC) which has a degree of substitution MS (HE) of from 0.10 to 1.00 and a degree of substitution DS (M) of from 1.25 to 2.20.

6. The process according to claim 1, wherein the methylhydroxyalkylcellulose is a methylhydroxyethylcellulose (MHEC) which has a degree of substitution MS (HE) of from 0.15 to 0.80, and a degree of substitution DS (M) of from 1.40 to 2.00.

* * * * *